(12) United States Patent
Jones, Jr.

(10) Patent No.: US 9,448,413 B2
(45) Date of Patent: Sep. 20, 2016

(54) WEARABLE STEREOSCOPIC VIEWER

(71) Applicant: Charles Wesley Jones, Jr., Knightstown, IN (US)

(72) Inventor: Charles Wesley Jones, Jr., Knightstown, IN (US)

( * ) Notice: Subject to any disclaimer, the term of this patent is extended or adjusted under 35 U.S.C. 154(b) by 0 days.

(21) Appl. No.: 14/740,372

(22) Filed: Jun. 16, 2015

(65) Prior Publication Data

US 2015/0370083 A1    Dec. 24, 2015

Related U.S. Application Data

(60) Provisional application No. 62/013,683, filed on Jun. 18, 2014.

(51) Int. Cl.
| | |
|---|---|
| *G02C 7/16* | (2006.01) |
| *G02B 27/22* | (2006.01) |
| *G02B 27/02* | (2006.01) |
| *G02B 27/01* | (2006.01) |
| *G02B 7/12* | (2006.01) |

(52) U.S. Cl.
CPC .......... *G02B 27/2242* (2013.01); *G02B 27/017* (2013.01); *G02B 27/0172* (2013.01); *G02B 27/027* (2013.01); *G02B 27/028* (2013.01); *G02B 7/12* (2013.01); *G02B 2027/0134* (2013.01); *G02B 2027/0156* (2013.01); *G02B 2027/0178* (2013.01)

(58) Field of Classification Search
CPC .......... G02C 7/16; G02C 11/02; G02C 5/02; G02C 5/12
USPC .......... 351/45, 46, 158, 44, 59, 60, 136, 138
See application file for complete search history.

(56) References Cited

U.S. PATENT DOCUMENTS

| | | | | |
|---|---|---|---|---|
| 3,421,233 A | * | 1/1969 | Gaal | G02C 5/001 251/45 |
| 5,675,398 A | * | 10/1997 | Moore | G02C 7/16 351/45 |
| 6,450,636 B1 | * | 9/2002 | Ylipelkonen | G02C 7/16 351/45 |

* cited by examiner

*Primary Examiner* — Hung Dang

(57) ABSTRACT

A wearable stereoscopic viewer having a frame with slots to position laterally movable left and right viewpoint optics to enable independent adjustment of the optics to the user's visual requirements, each optic having a lens and an occluding element, the left occluder configured to prevent the right image from being seen with the left lens, the right occluder configured to prevent the left image from being seen with the right lens, so that the left eye of the user sees only the left image, and the right eye of the user sees only the right image, respectively; the optics being secured into the slots with a nosepiece configured to be attachable to and releasable from the frame, to permit the optics to be removable and replaceable with optional types of optics.

3 Claims, 4 Drawing Sheets

WEARABLE STEREOSCOPIC VIEWER

BACKGROUND OF THE INVENTION

This application claims the benefit of U.S. Provisional Application No. 62/013,683, filed on Jun. 18, 2014.

The present invention relates to a wearable stereoscopic viewer that can be used to view stereographic 3D image content composed of left and right images, an image format well known in the art. The stereographic 3D imagery can be conveyed by desktop computer, laptop, tablet screens and printed material, if the ink-dot matrix of said printed material is of a sufficiently high resolution that prevents the perception of the ink dots from interfering with the perception of the imagery. The present invention can view still or motion stereographic 3D imagery. The present invention can be made of injection-molded plastic with techniques familiar to those skilled in the art.

The present invention is configured with laterally movable left and right viewpoint optics, to enable adjustment of the optics to the inter-pupillary distance of the user. Each optic is positioned by a slot in the frame to facilitate independent adjustment relative to the other optic. Each adjustable optic has a lens and an occluding element. When properly adjusted, the left occluder prevents the right image from being seen with the left lens, and the right occluder is prevents the left image from being seen with the right lens, respectively.

The optics are secured into the slots with a nosepiece configured to be attachable to and releasable from the frame, to permit the optics to be removable and replaceable with optional types of optics.

The nosepiece has fixed occluding elements configured to occlude the passage of any stray light from the images that impinges between the nosepiece and the inside edges of the occluders, so that the left eye of the user sees only the left image, and the right eye of the user sees only the right image, respectively.

The feature of the releasably attachable nosepiece permits optional types of optics to be used, including optics that possess a power of magnification, which is useful for viewing small format screens such as tablets, providing that the power of magnification does not reveal image pixelation and thus degrade the quality of the perceived imagery. Prism power can also be configured into the optics to aid the user in the process of left and right stereographic 3D image fusion.

In addition, optics can be configured with only prism power, i.e., without magnification power, to enable viewing of larger format screens from various focal lengths. However, flat faced prisms should not be configured in the present invention, because flat faced prisms have inherent optical problems, such as image distortion and color separation. Curved prisms, usually in a meniscus format, can substantially reduce these said optical problems. Such curved prisms are in effect, corrective lenses with a zero power.

If a user wears prescription glasses, the frame of the present invention can be placed over the glasses, permitting the optics of the viewer to be positioned in front of the user's glasses, and work in concert with them.

SUMMARY OF THE INVENTION

The present invention can be useful for casual viewing of many kinds of stereographic 3D visual content, including photographic imagery from actual reality and digitally rendered virtual imagery. While the present invention does not possess the features of more complex and expensive virtual reality systems, it's a fun and easy way to quickly look at stereographic 3D content. It can be produced for a relative low cost. It's lightweight and comfortable to wear. Because of these factors, it can be accessible to anyone who uses a tablet, or other screen device, and could be used for entertainment, education, and medical applications more readily than virtual reality systems.

BRIEF DESCRIPTION OF THE DRAWINGS

A complete understanding of the present invention may be gained from a consideration of the following description taken in conjunction with the accompanying drawings in which.

DETAILED DESCRIPTION OF THE INVENTION

Figure 1:
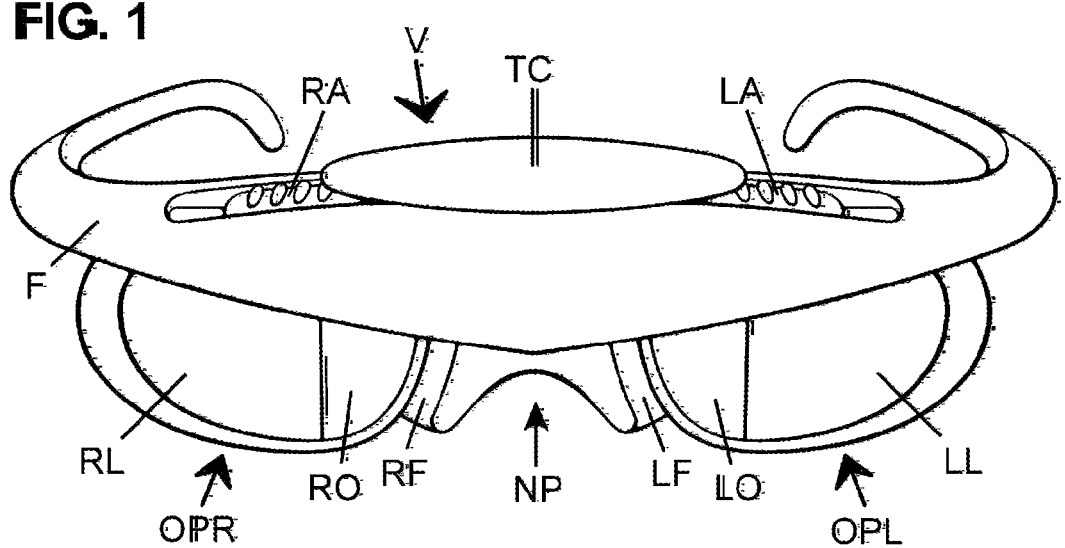
FIG. 1 is a front perspective view of the present invention, tilted slightly downward to reveal the various features and components.

Referring to the drawings, FIG. 1 is a front perspective view of viewer V, tilted slightly downward to reveal frame F, which holds right optic OPR, configured with integral features right lens RL, right occluder RO and right adjuster switch RA. Left optic OPL, configured with left lens LL, left occluder LO and left adjuster switch LA, is also designated. Nosepiece NP is indicated with its integral features, including right fixed occluder RF, left fixed occluder LF and top cover TC, which partially covers adjustment switches RA and LA, and if the device is set upside down on a surface, top cover TC prevents the switches from contact with the surface.

Figure 2:
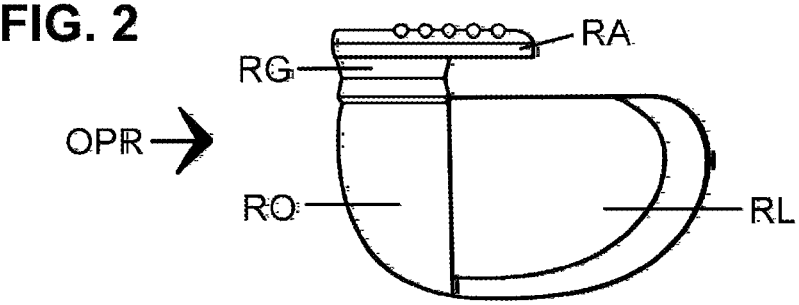
FIG. 2 is an elevational view of the right optic and its integral features.

FIG. 2 is an elevation view of right optic OPR, shown from the side that would be closest to the user's eye. The integral features of this optical piece are indicated, including right lens RL, adjustment switch RA, which is integral with right guide RG. Right occluder RO is indicated, and it should be noted that this occluder can be configured as a "frosted" textured surface adjacent the clear surface of lens RL, and occluder RO can also be tinted depending on the application. It should be understood that left optic OPL is similar to right optic OPR in these noted features.

Figure 3:
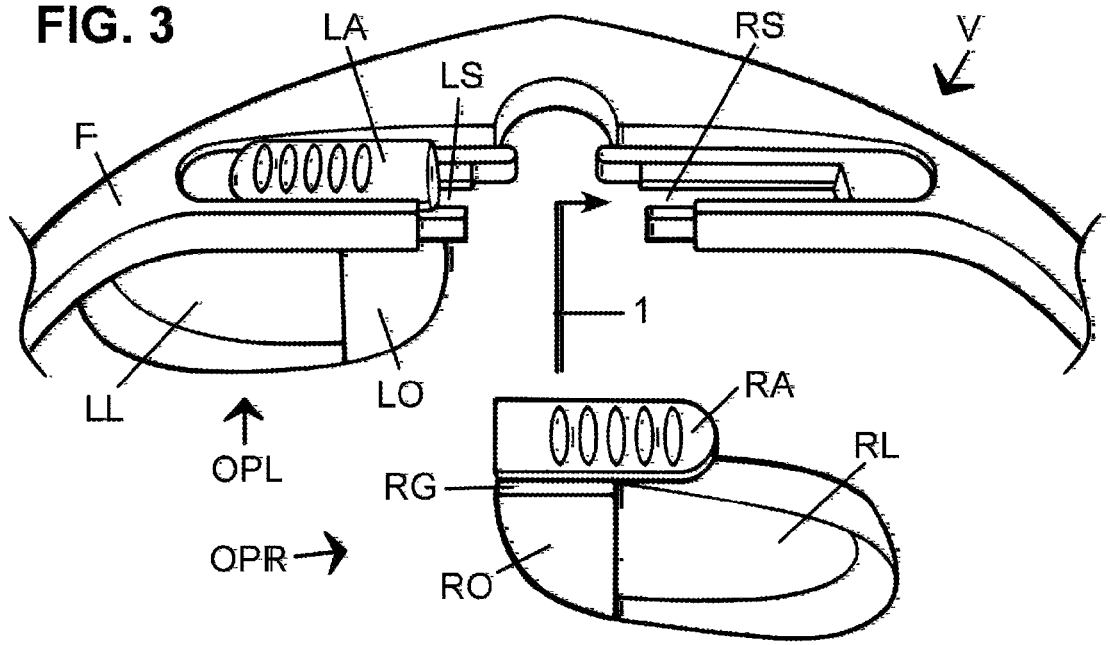
FIG. 3 is a sectional perspective view from the angle that would be commonly seen by the user, and illustrates the right optic oriented to be inserted into the frame of the present invention. The left optic is shown in an inserted position.

FIG. 3 is a sectional perspective view of viewer V from an angle that would be commonly seen by the user, and illustrates right optic OPR oriented to be inserted into the frame of the present invention. Right optic OPR can be moved in the path indicated by arrow 1, so that right guide RG slides into right slot RS, thereby positioning right adjustment switch RA on top of right slot RS. Left optic OPL is also shown in its correct position in frame F after it has been inserted in left slot LS. It should be understood that after they have been placed in their respective slots RS and LS in frame F, both optics OPR and OPL are laterally moveable and independently adjustable relative to each other. It should be understood that the procedure for removing the optics OPR and OPL from frame F to replace them with optional optics would be the reverse of the procedure shown.

Figure 4:
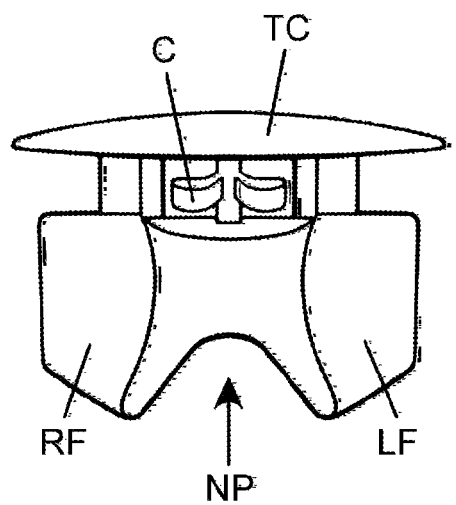
FIG. 4 is a front perspective view of the nosepiece of the present invention, tilted slightly downward to reveal the features.

FIG. 4 is a front perspective view of nosepiece NP of the present invention, tilted slightly downward to reveal the integral features, including the fixed occluders RF and LF, which function to eliminate the passage of any stray light that could pass between the nosepiece and the inside edges of adjustable occluders RO and LO. Also shown is the aforementioned integral top cover TC, and integral coupler C, the function of which will be detailed in FIGS. 7-9. This view indicates the position of coupler C in nosepiece NP.

Figure 5:
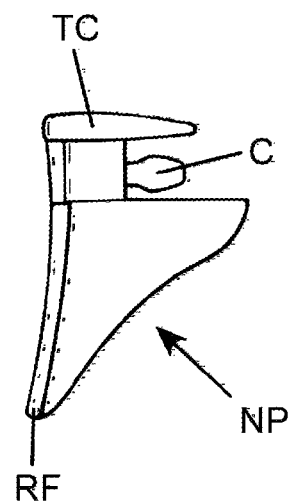
FIG. 5 is a side elevational view of the nosepiece, which corresponds with FIG. 4.

FIG. 5 is a side elevational view of nosepiece NP which corresponds with FIG. 4, and further illustrates the shapes and positions of top cover TC, right occluder RO, and coupler C.

Figure 6:
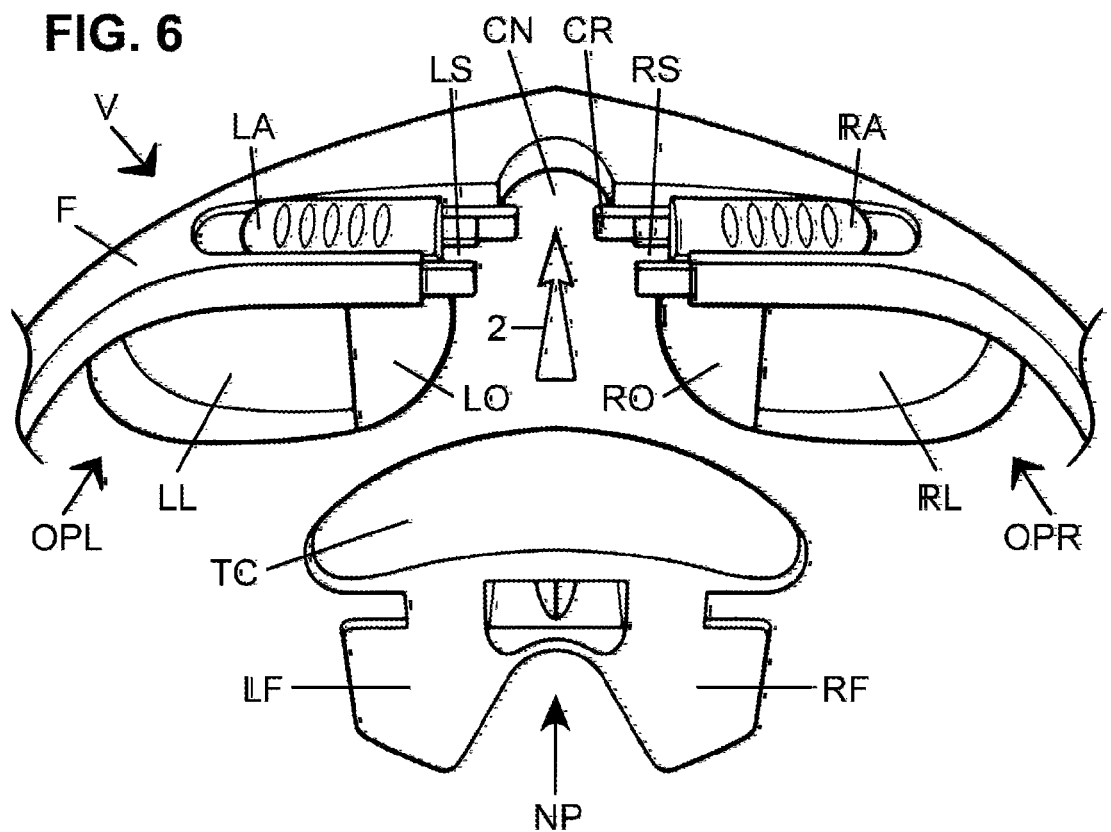
FIG. 6 is a sectional perspective view from an angle that would be seen by the user, illustrating the nosepiece oriented to be inserted into the frame of the present invention.

FIG. 6 is a sectional perspective view of viewer V from an angle that would be seen by the user, illustrating nosepiece NP oriented to be inserted in the direction shown by arrow 2 into frame F of the present invention. Along with the previous designations, there are designations for coupler niche CN, a space in frame F which receives nosepiece NP coupler C, and coupler C retainer CR, (one of two is indicated) which will retain coupler C in a releasably attachable position in frame F.

Figure 7:
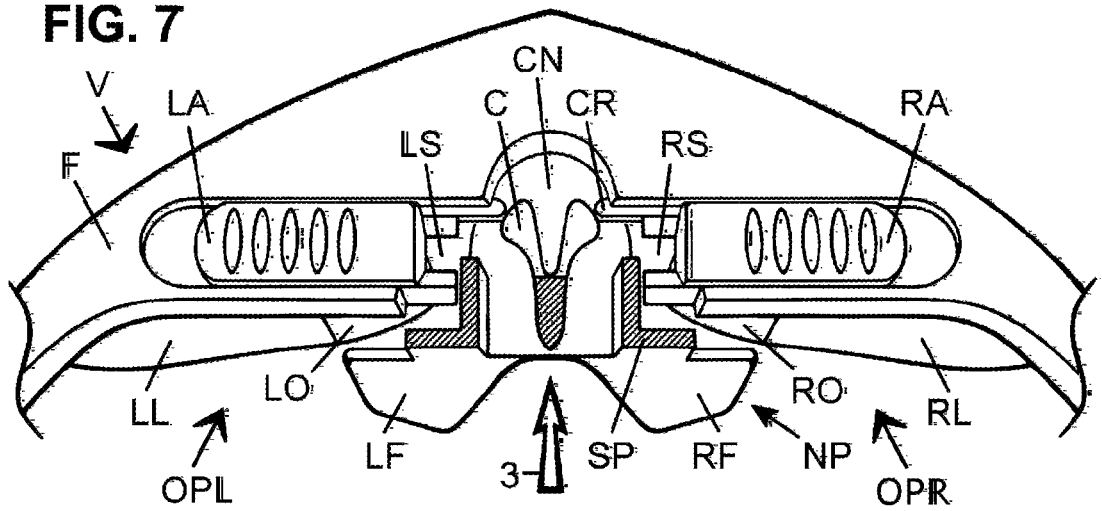
FIG. 7 is a sectional plan top view with a portion of the nosepiece cut away to reveal how the nosepiece attaches to the frame of the present invention.

FIG. 7 is a sectional plan top view of viewer V with a portion of nosepiece NP cut away, as indicated by the diagonal lines of sheared plane SP, to reveal how nosepiece NP attaches to frame F of the present invention, whereby coupler C is pressed, in the direction shown with arrow 3, against coupler retainer CR and towards coupler niche CN.

Figure 8:
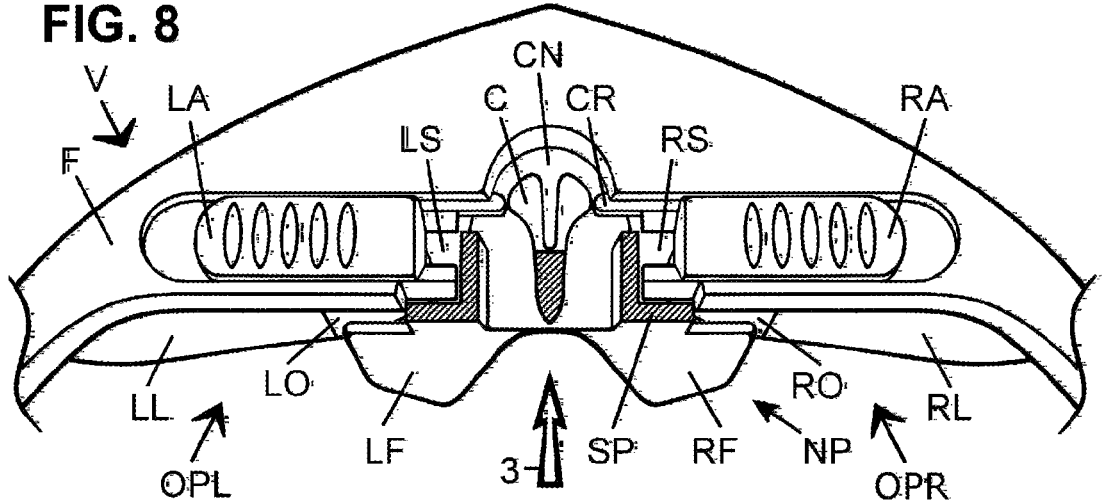
FIG. 8 is a sectional plan top view that corresponds to FIG. 7, further showing the attachment of the nosepiece to the frame of the present invention.

FIG. 8 is a sectional plan top view of viewer V that corresponds to FIG. 7, further showing the attachment of nosepiece NP to frame F of the present invention; whereby the compression of flexible coupler C is shown, as it is pressed against coupler retainer CR and moves into coupler niche CN, in the direction shown by arrow 3.

Figure 9:
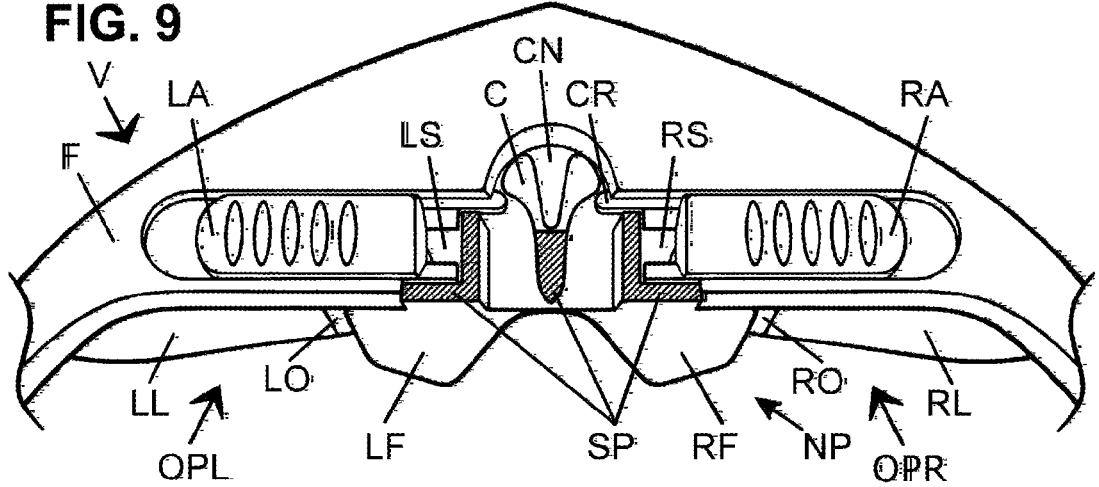
FIG. 9 is a sectional plan top view that corresponds to FIGS. 7 and 8, showing the nosepiece in an attached position.

FIG. 9 is a sectional plan top view of viewer V that corresponds to FIGS. 7 and 8, showing nosepiece NP in an attached position, whereby coupler C has flexed back to its remembered shape and occupies coupler niche CN, and is retained in this position by coupler retainer CR. The shape of coupler C also enables it to be withdrawn from coupler niche CN, so that nosepiece NP can be released from frame F, and optional types of optics can be interchanged. It should be understood that the process of withdrawing nosepiece NP from frame F would be the reverse of the process illustrated in FIGS. 7, 8 and 9.

Figure 10:
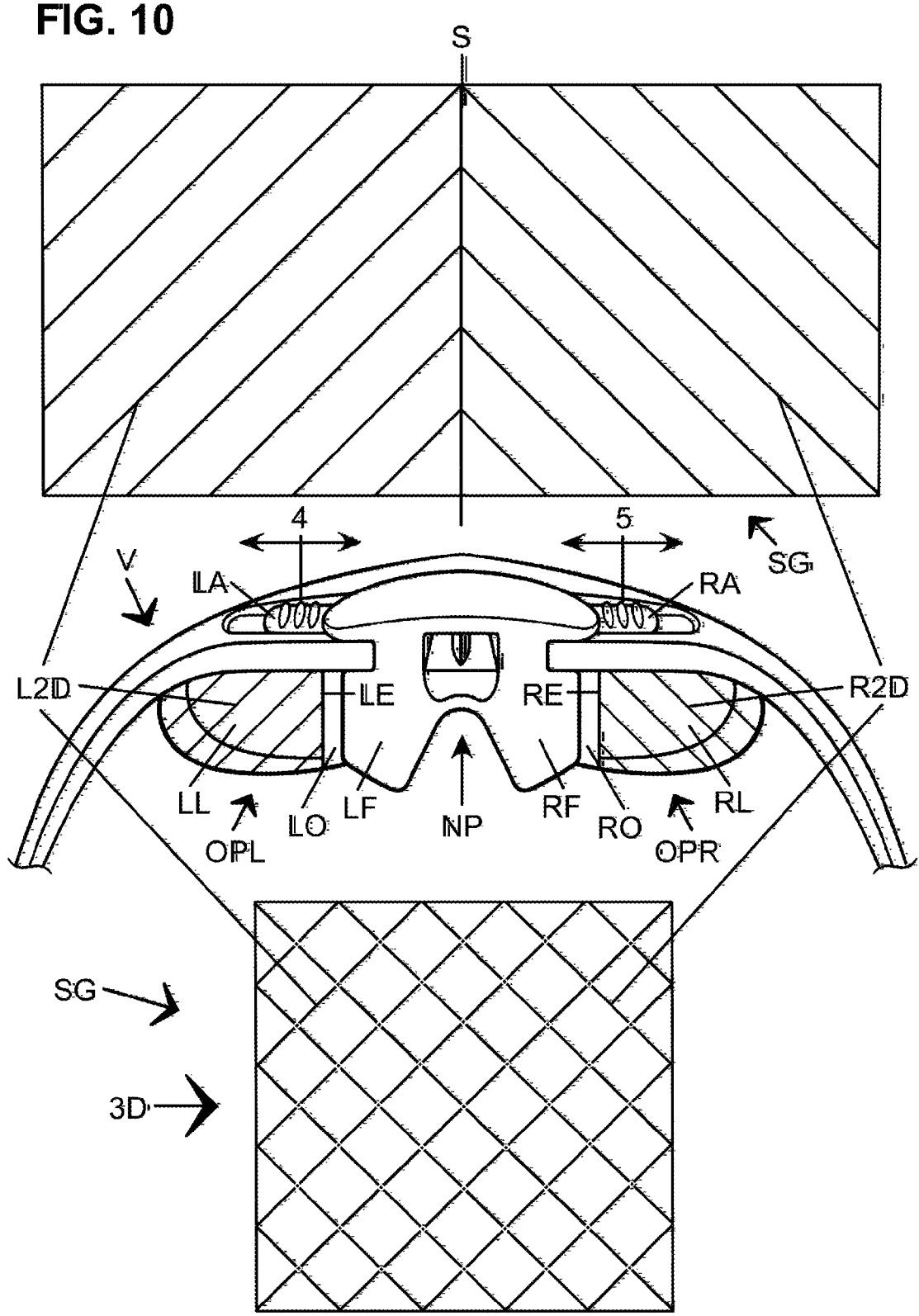
FIG. 10 is a sectional perspective view diagramming the functional operation of the present invention.

FIG. 10 is a sectional perspective view of viewer V and stereograph SG diagramming the functional operation of the present invention. The stereographic content fields of stereograph SG are shown as schematic diagrams, and do not represent any specific imagery. The diagonal lines indicate the position and extent of the left and right optical fields, L2D and R2D, respectively. Left stereographic content field L2D is separated by line S from right stereographic field R2D.

When a user wears and looks through viewer V, they can orient themselves to view content in an intuitive manner, similar to how they would normally position themselves to see visual content. This method of positioning would vary according to the format, for example, one would sit in front of a desktop screen, and one would hold or prop a tablet or laptop in various positions. Once they have the content approximately lined up in front of them, they can adjust optics OPL and OPR, and thus, lenses LL and RL and occluders LO and RO with siding adjustment switches LA and RA in the directions indicated by arrows 4 and 5, respectively, so that the left edge LE of left occluder LO occludes the right image field R2D on line S, thereby permitting only the light of left image field L2D to be seen by the user through left lens LL, and the right edge RE of right occluder RO occludes the left image field L2D on line S, thereby permitting only the light from right image field R2D to be seen by the user through right lens RL. When the above indicated elements of the present invention are correctly adjusted by the user and aligned with their individual inter-pupillary requirements, fusion of left image field L2D with right image field R2D occurs in the brain of the user, producing a merged three dimensional image field of stereograph SG, as schematically indicated by field 3D.

Whereas the present invention is susceptible of various modifications and alternate constructions, the embodiments suggested in the accompanying four sheets of drawings will herein be described in sufficient detail. It should be understood, however, it is not the intention to limit the present invention to the forms disclosed, but to indicate the general position of the forms and thus define the functional objectives of the present invention.

What is claimed is:

1. A wearable stereoscopic viewer comprising:
a frame with laterally movable left and right viewpoint optics to enable adjustment of the optics to the inter-pupillary distance of the user, each optic positioned by a slot in the frame to facilitate independent adjustment relative to the other optic; each optic having a lens and an occluding element, the left occluder configured to prevent the right image from being seen with the left lens, the right occluder configured to prevent the left image from being seen with the right lens, respectively; the optics being secured into the slots with a nosepiece configured to be attachable to and releasable from the frame, to permit the optics to be removable and replaceable with optional types of optics; said nosepiece having fixed occluding elements configured to occlude the passage of any stray light from said images that impinges in the space between said nosepiece and the inside edges of said adjustable occluders, so that the left eye of the user sees only the left image, and the right eye of the user sees only the right image, respectively.

2. The device of claim 1, whereby the optics are configured with lenses having magnification and prism to enable and enhance the user's perception of small format stereographic 3D imagery.

3. The device of claim 1, whereby the optics are configured with lenses having prism with zero magnification to enable and enhance the user's perception of stereographic 3D imagery of various format sizes and viewing distances.

* * * * *